ALBERT T. HARRIS.
INVENTOR.

ATTORNEY.

Patented Apr. 22, 1941

2,239,229

UNITED STATES PATENT OFFICE 2,239,229

CALCULATING DEVICE

Albert T. Harris, New York, N. Y., assignor to Cal-Ku-Scope Inc., New York, N. Y., a corporation of New York Application July 9, 1940, Serial No. 344,571

9 Claims. (Cl. 33—98)

This invention pertains to calculating devices and more particularly to a device for use in conjunction with mechanically calculating problems having trigonometric and/or geometric functions.

The present invention utilizes a pair of pivoted arms with protractor means for indicating the angle between the arms and a vernier scale is provided for precision in reading the master protractor. A pair of complemental sliding members are utilized for interconnecting the free ends of the pivoted master members, and the sliding members each are pivoted to one side of the free ends of the master arms. Protractor means are provided at the interconnecting angles of the sliding member of the master arm members so that it will be possible to read any other angle on any of the adjacent sides. Vernier scales are provided on the secondary angles for precision reading. Graduations are indicated from a scale connected along the length of the master arms and the interconnecting cross member or reciprocating slide so that not only the angles may be read on the protractor but the length of the side may be read as well.

This is the general operation of the device when three sides are used, but when a triangle is utilized as a basic means for mechanically calculating an intermediate side in length, or an angular relation with the remainder of the triangle, an intermediate arm is used, which for the purpose of reading the scale, has a point which engages graduations on the reciprocating slide arm.

It is an object of this invention to provide a means for mechanically calculating general problems in trigonometry, geometry and other problems which generally utilize in their calculations, angles, and lengths of sides.

A further object of the invention is to provide means for working out certain mathematical problems mechanically and to read the answer directly from the device by observation.

Further and other objects may be and may become apparent to those skilled in the art from a perusal of the following specification and the drawings.

Figures 1, 2, 3:
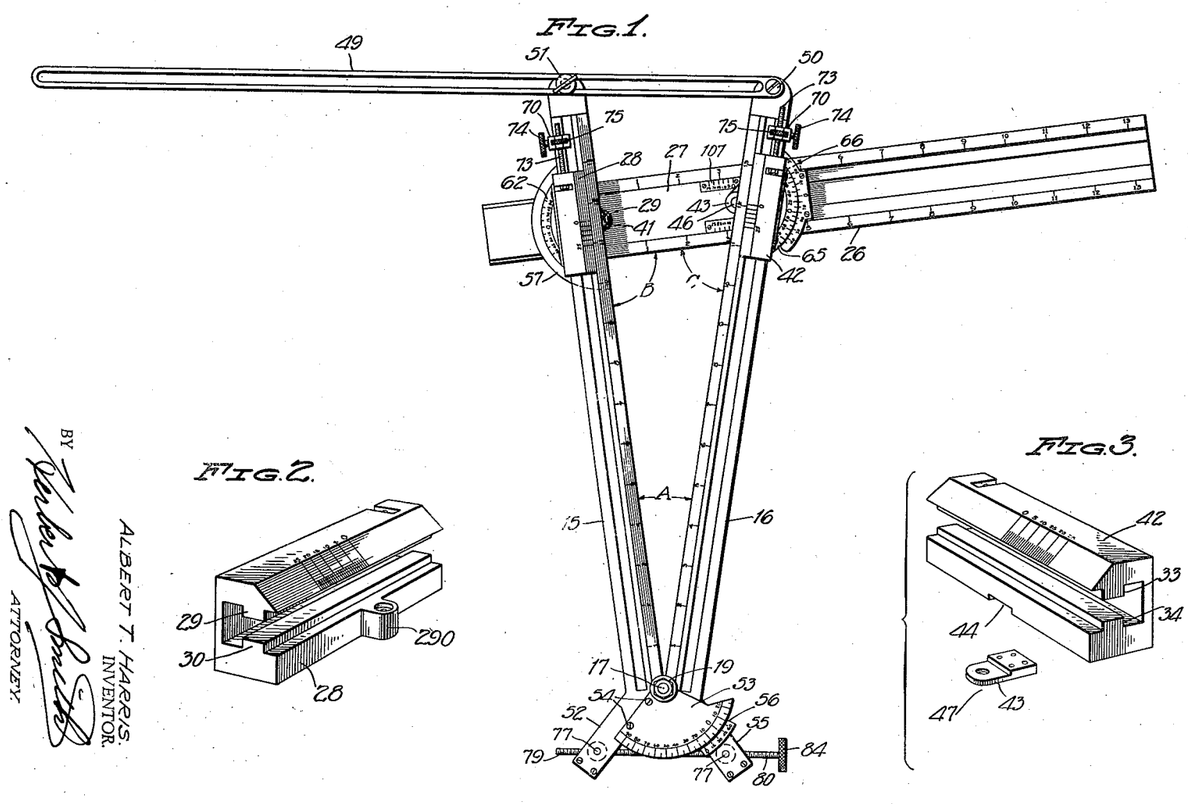
Fig. 1 shows a plan view of the calculating device.
Figs. 2 and 3 are perspective views of the master vernier.

Referring to the drawings and more particularly to Fig. 1, members 15 and 16 are the left and right master arms respectively which are pivoted on a pin 17 having a head 18 with a nut 19 which holds the two master arms together. This is more clearly shown in Figs. 9 and 11 wherein the pin 17 has a stud 20 which fits into a small hole (not shown) of the member 21 to prevent pin 17 from rotating in relation to the master arm 15. Associate members 21 and 22 receive a complementary member 23 which slides between the members 21 and 22 so as to be workable on the shoulder 24 of the pin 17.

Figure 4:
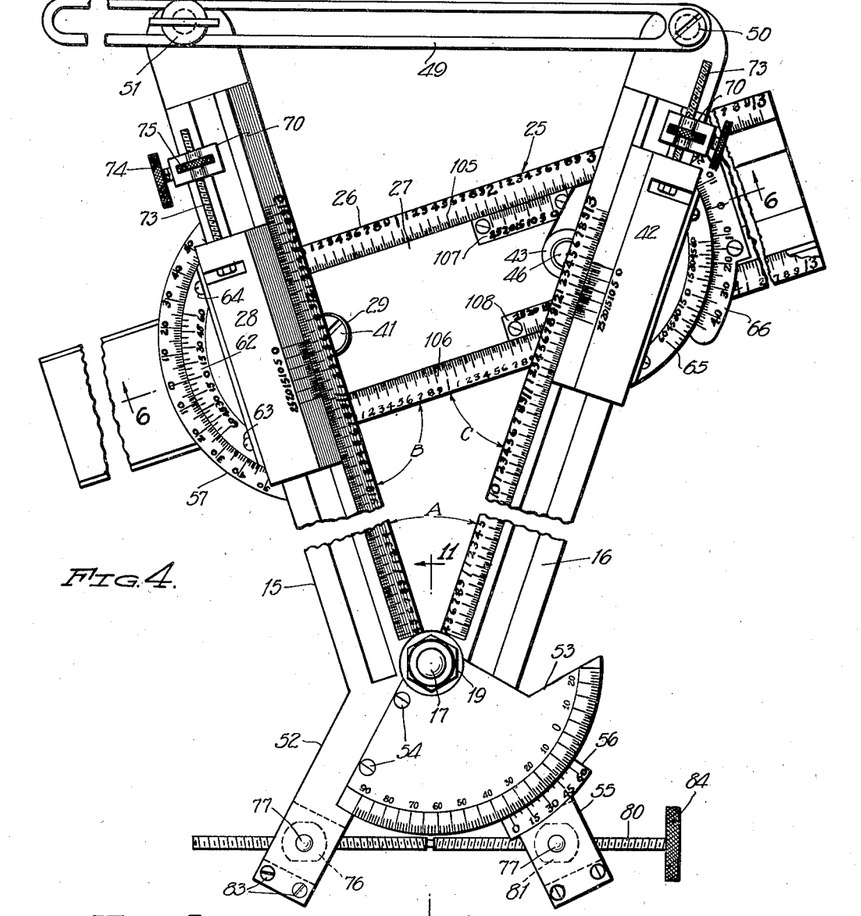
Fig. 4 is an enlarged view of Fig. 1 partly broken away to denote the detail of assembly.

In the plan views showing Figs. 1 and 4, the cross reciprocating member 25 comprises a reciprocating base 26 and a reciprocating slide 27. The band 38 sets in slots 109 and 110.

The left master vernier 28 has tongues 29 and 30 which slide in grooves 31 and 32, which grooves are formed on the left master arm 15. The right master vernier has tongues 33 and 34 which slide in grooves, 35 and 36 of the right master arm 16.

Figure 5:
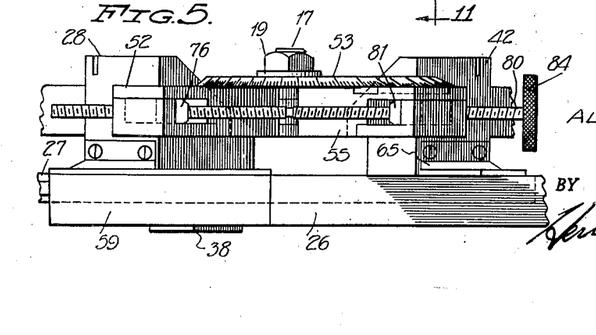
Fig. 5 is an end view of Fig. 4.

The left master vernier 28 has a hub 290 which hub has a bushing 37 fitted therein. A narrow metallic band 38 fits around the base and slide, parts 26 and 27 respectively and the metallic band has a threaded portion 39 thereon which receives the threaded portion 40 of the screw 41. The right master vernier 42 has a small metallic plate 43 which fits into the groove 44 (Figs. 3, 4, and 5) and is held in place by screws 45. A screw 46 is fastened into shoulder 47 so that the bushing 48 will permit a proper working adjustment for the right master vernier. The base and slide 26 and 27 respectively are more clearly shown in section in Fig. 7 having the metallic band 38 around the two parts.

A locking slide 49 is pivoted by a screw 50 to the free end of right master arm 16, while the wing nut 51 slidably engages the arm 49 and holds said arm in a fixed position when the wing nut is turned to frictionally clamp the locking arm against the free end of the left master arm.

Figure 6:
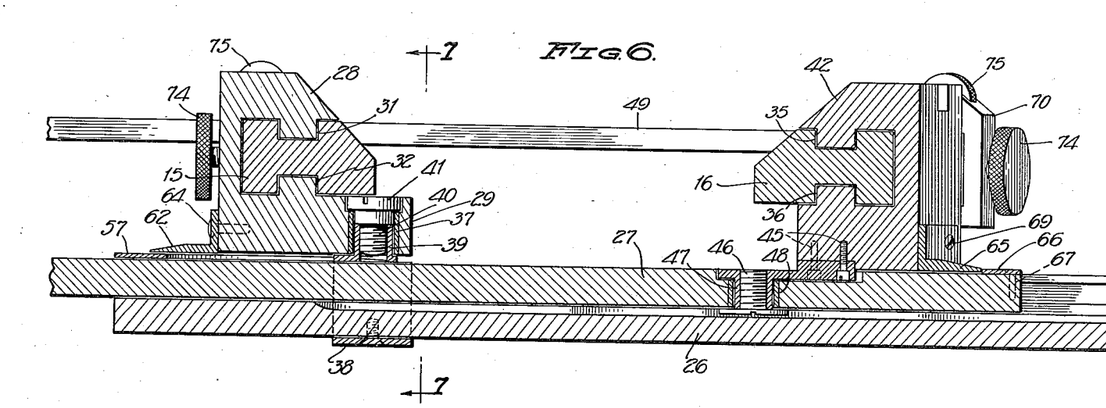
Fig. 6 is a view taken substantially along lines 6—6 of Fig. 4 to more specifically show the relation between the left and right master arms with the reciprocating master slides.

The left master arm has an extension 52 with a master protractor 53 secured thereon by screws 54. The right master arm 16 has an extension 55 thereon with a vernier member 56 secured to the extension 55. It will be noted that when the left and right master arms are closed together the degrees therebetween will be indicated as zero by the indications of the protractor in conjunction with the vernier scale. A protractor 57 is secured to one end of the reciprocating base member 26 and fits on the widened portions 58 and 59 which has holes 60 and 61 to receive small screws which go through the protractor to hold it in fixed relation. A vernier scale 62 shown in Fig. 6 is secured to the left master vernier 28 by means of screws 63 and 64. The slide 27 has a protractor 66 which is fastened by screws 67 into holes 68. A vernier 65 is fastened by means of screws 69 to the right master vernier 42 so that the vernier 65 may be read in cooperation with the protractor 66.

Figure 7:
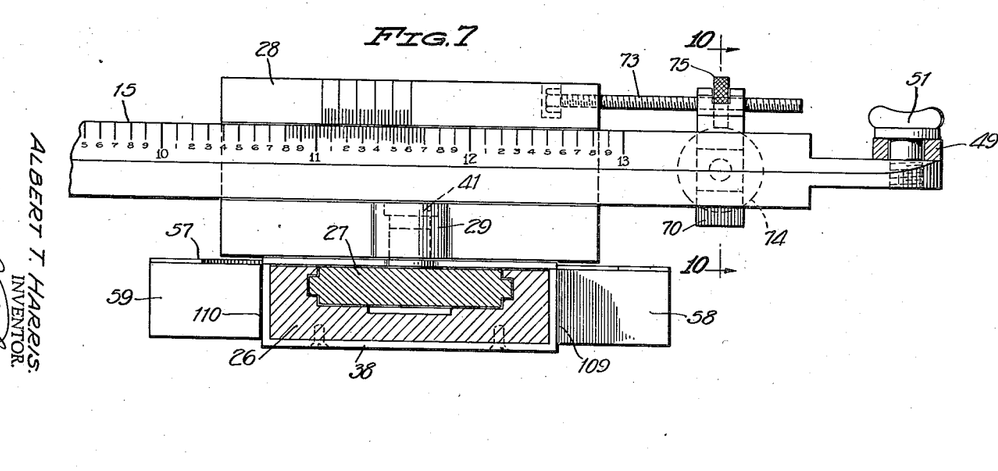
Fig. 7 is a view taken substantially along lines 7—7 of Fig. 6.
Figures 8, 9, 10:
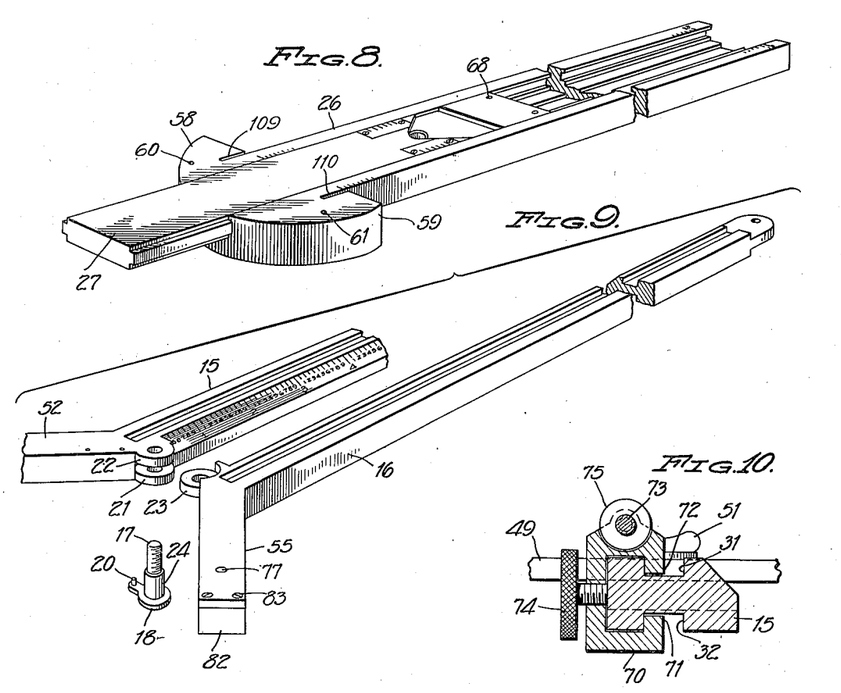
Fig. 8 is a perspective view partly broken away to show the relation of the reciprocating slide member with the reciprocating base member.
Fig. 9 is a somewhat exploded perspective view partly broken away to show the manner in which the master arms are pivoted together.
Fig. 10 is a sectional view taken substantially along lines 10—10 of Fig. 7 to show the master vernier slide member locating means.

Figs. 6, 7 and 10 show the parts for general manipulation of the master vernier slides. Referring particularly to Fig. 10, a clamp 70 is shown having tongues 71 and 72 which slide in grooves 31 and 32 as shown in Fig. 6. The clamp 70 is connected to the master vernier by a screw 73. The master vernier in sliding along the groove will move the clamp with it. When in use the knurled screw 74 which is threadedly engaged to the clamp, will be tightened to hold the clamp in fixed relation to the master arm. Thereafter, the knurled nut 75 may be turned in either direction to move the master vernier slide along the master arm. The operation of the right master vernier slide is substantially identical as the operation described for the left master vernier slide.

Referring to Figs. 1, 4 and 5 and 11 it will be noted that a nut 76 is pivotally mounted at 77 and 78 which nut has threads therein to receive the threaded member 80 which member has left and right hand threads on opposite ends thereof. The nut 76 will have threads to correspond with the screw threads which it is adapted to receive. The nuts 76 and 81 are located on the extensions 52 and 55 respectively. The nuts are fixed on their respective extensions by means of an L shaped clamp 82 which is secured thereon by means of screws 83. The knurled head 84 is a part of the threaded member 80 so that a rotation of the member 84 will cause master arms 15 and 16 to be moved to and fro as the manipulations require.

The master protractor 53 has graduations from zero to 90 so that at least a 90 degree angle can be read to denote the angular relation between the master arms 15 and 16. The protractor 57 secured to the reciprocating base 26 has graduations left and right of a zero mark 90 degrees on either side thereof. The protractor 66 secured to the slide member 27 of the cross reciprocating bar has graduations from zero to 45 on either side of the zero mark.

Figures 12, 13, 14:
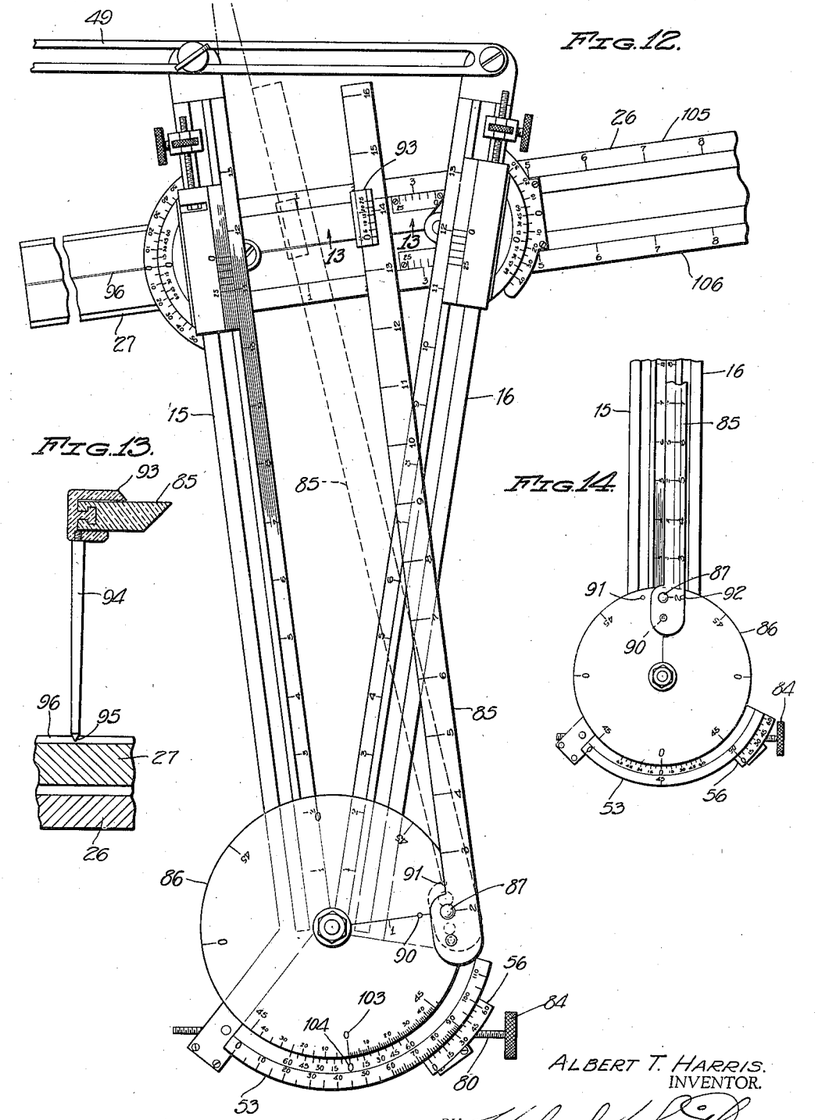
Fig. 12 is a modification of Fig. 1 showing means for working the device with additional angles.
Fig. 13 is a view taken along lines 13—13 of Fig. 12 showing the vernier of the center or auxiliary arm in a given relation to the reciprocating slide member.
Fig. 14 is a partial view of Fig. 12 in a fully inoperative position.
Figure 18:
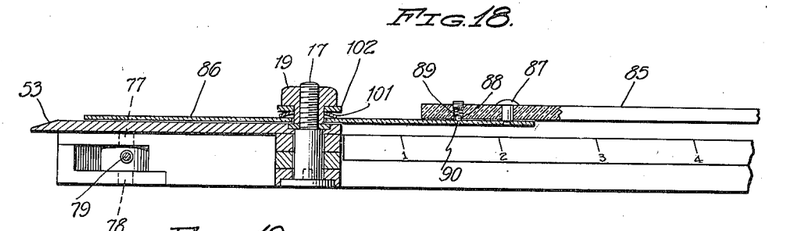
Fig. 18 is a view taken along lines 18—18 of Fig. 15 showing the relation of the disc and its auxiliary arm in relation to the master vernier.

The view in Fig. 12 is substantially the same as the views shown in Figs. 1 and 4 with the exception that a center or auxiliary arm 85 is added. Referring to Fig. 18 it will be seen that the center or auxiliary arm 85 is pivoted to a 360 degree disc 86 by a pin 87 having a ball and spring 88 and 89 respectively, which ball rests in a detent 90 when the auxiliary arm is in a neutral position. Detents 91 and 92 shown in Fig. 19 permit the auxiliary arm to be moved 90 degrees either side of the neutral detent indicated as 90.

The auxiliary arm has a vernier 93 which slides along one edge of the auxiliary arm 85 which is shown in detail in Fig. 13. A pin 94 or marker is secured in the vernier on the lower portion thereof and the point 95 of the pin slides in a groove 96. The groove 96 in the instance shown in Fig. 12 is a groove to permit the point 95 to be moved while remaining in the axial center of the reciprocating slide 27.

Figures 15, 16, 17:
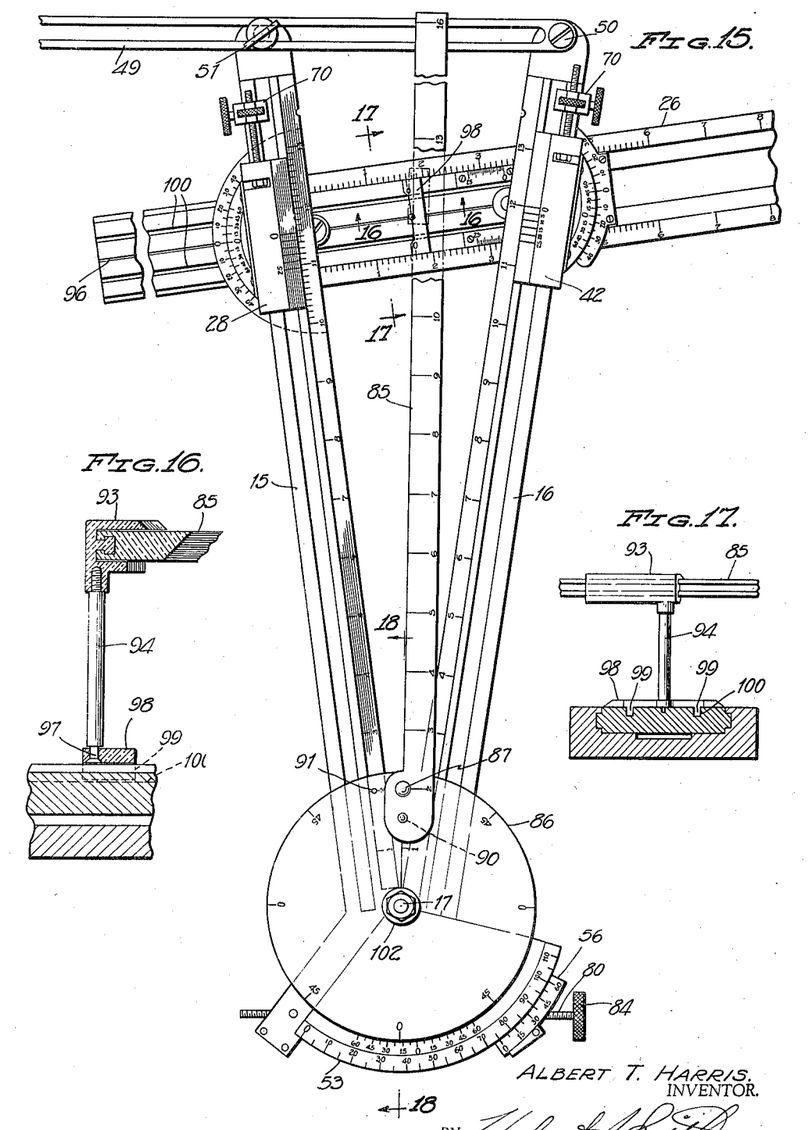
Fig. 15 is a view of Fig. 12 with the auxiliary arm in a neutral position.
Fig. 16 is a sectional view taken along lines 16—16 of Fig. 15.
Fig. 17 is a view taken along lines 17—17 of Fig. 15.

Fig. 16 shows a modification of the view shown in Fig. 13 wherein the pin 94 instead of having a point thereon may have a headed stud 97 which is held in the cross piece 98 said cross piece having tongues 99 which slide in grooves 100 substantially along the length of the reciprocating slide.

Figure 11:
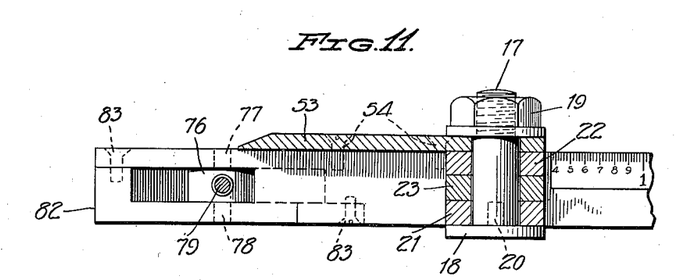
Fig. 11 is a sectional view taken substantially along lines 11—11 of Fig. 4 more specifically showing the construction of parts of the invention.

The assembly shown in Fig. 18 is substantially that as shown in Fig. 11 except that a spring washer 101 may be added between the upper surface of the disc 86 and the washer 102 to properly tension the disc when in operation.

It will be noted that the disc 86 has graduations thereon but the graduations are divided into four 90 degree groups with a zero point having a 45 degree marking on either side thereof in each of the four instances. Fig. 12 shows the disc 86 having one portion thereof marked in detail, and it will be observed that the ball 88 having been moved to one of the side detents on the disc, with the zero setting 103, on the disc 86, coinciding with the zero setting 104 on the master protractor 53 of the master arm 15, the auxiliary arm 85 being parallel to the master arm 15. The converse of this being true that if the ball 88 was moved to detent 91 and the zero setting on the respective protractor properly alined the auxiliary arm would be parallel with the right master arm 16.

The graduations on the left and right master arms, reciprocating member, and intermediate member may be in any convenient form such as in centimeters, inches, feet or any other suitable standard which the particular problem may demand and to which the calculating device may be adapted.

From the foregoing it will be seen that the left and right master arms are pivoted toegther and the angle therebetween may be read on the master protractor 53. The angle between the reciprocating member 27 and the master arm 15 may be read on the slide protractor 57, since the zero marking of the scale 62 remains in a lateral fixed relation with the master arm 15. The angle between the base reciprocating member and the right master arm may be read on scale 66 in register with the zero marking on scale 65 since the scale 65 remains in a lateral fixed position in relation to the right master arm 16.

As the angle between the master arms registering decreases it is obvious that the distance between any given two points of angles on the reciprocating slide will be decreased.

In Fig. 4 the graduated scales 105 and 106 are on opposing sides of the base reciprocating member 26 and when the base reciprocating member is at right angles to the left master arm 15 the zero reading of both scales 105 and 106 will be in line with the graduated edge of the left master arm 15. Since the slide 27 is pivoted to the master vernier 28 (Fig. 2), the zero marking of the left master vernier will be read according to the graduations on the left master arm, while the length of the right master arm will be read from the graduations of the right master arm in conjunction with the graduations of the right vernier. The reciprocating slide 27 has verniers 107 and 108 which coincide with the graduated portions 105 and 106 respectively of the base portion 26. Either the scale 105 or 106, in conjunction with its respective vernier, may be used to indicate the distance between the converging sides of angle B or C. Angle A is indicated as being the angle between the master arms 15 and 16 on Fig. 1. The zero markings on verniers 107 and 108 coincide with the center of the pivot 46 at all times, so that the length of the reciprocating member may be read on either scale in conjunction with its associated vernier.

Referring to Figs. 12, 14, 15, 19 and 20, it will be noted that Fig. 15 has the auxiliary arm 85 with the pin 87 in the indenture 90. The auxiliary arm 85 may be moved to any angle so that the particular result desired will be obtained, that is, after the angle between the auxiliary and one of the master arms is known then that angle may be set between the disc 86 and the master protractor 53. If the angle is not known but the length of the side between the angle B and C is known then this distance may be set by bringing the pin such as 94 into a position where the zero marking of the scale 98 coincides with the proper measurement on the scales 105 and/or 106.

Figures 19, 20:
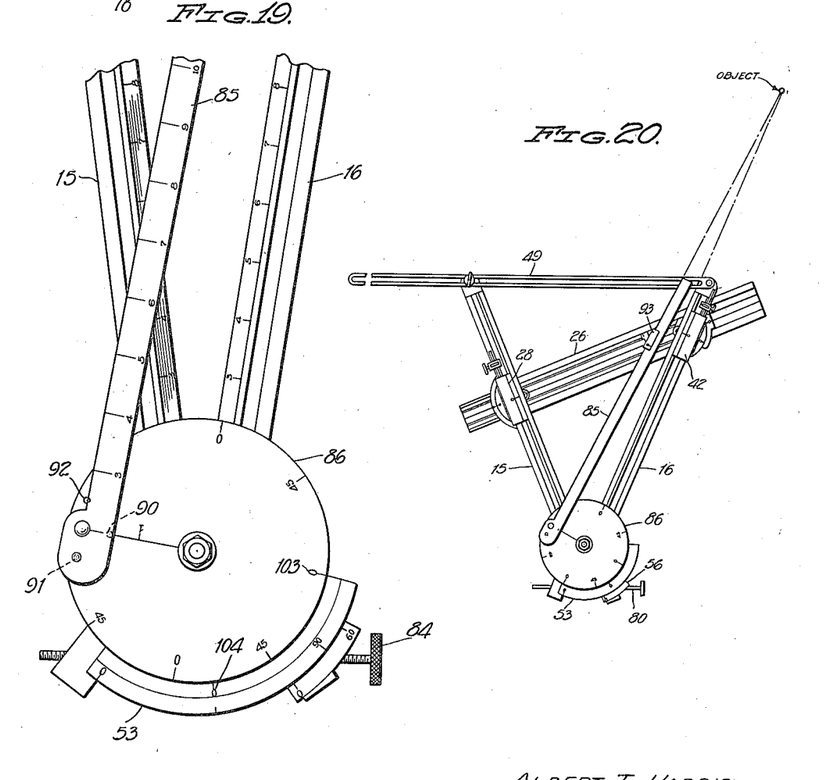
Fig. 19 is a view substantially the same as that shown in Fig. 14 with the master and auxiliary arms in a different position.
Fig. 20 is a view showing the apparatus in use with a definite problem.

If the particular problem involved requires an angular relation between one side such as shown by master arm 15 and another side such as shown by auxiliary arm 85, this may be indicated by swinging the auxiliary arm protractor to a position as shown in Fig. 12 or 19 and by checking with the protractor scales to determine the proper angular relation between sides such as members 15 and 85. The showing in Fig. 12 indicates that the zero marking 103 coincides with the zero marking 104 and therefore the members shown as 15 and 85 are parallel and a problem concerning sides such as disclosed may be worked therefrom. The auxiliary arm 85 shown dotted in Fig. 12 indicates that the disc 85 may be rotated for a particular problem to a desired position.

When the known quantities such as length or angles are sufficient to permit a setting of the calculating device the angles and distances may be properly set on the calculating mechanism. After this is done the remaining sides and/or angles may be read directly on the device.

The showing in Fig. 20 indicates that in the event the calculating device was set up to take a "sight" at the "object" as shown, the distances from the object may be read from the scales of the mechanical device. After the angular relation between the arms 16 and 85 is properly adjusted according to the "sight."

As indicated in Fig. 4, the angular relation between the master arms 15 and 16 may be adjusted by manipulation of the screw 80 by turning the knob 84. This adjustment will move the master arms to and fro. After this operation, the angular relation therebetween may become fixed by turning the wing nut 51 until the member 49 is frictionally secured in relation to the master arm 15. While the locking member 49 is advantageous under certain conditions it is to be understood that it is not essential to the proper operation of the rule.

The length of the master arms and the reciprocating slide member is herein shown as being thirteen inches in length but it is to be understood that this figure is arbitrary and any length or marking may be used depending on the particular function of the rule and the particular problems in which the rule is to be used for mechanically obtaining the results desired.

While it is true that certain of the possibilities of the instrumentalities shown herewith have been indicated briefly, it is to be understood that it would be quite impossible to set out all of the purposes to which the device may be adapted.

While certain of the objects have been indicated and specific structure shown the invention is not to be confined to the specific showing but may be modified as desired to embrace any and all equivalents that may be possible within the scope of the annexed claims.

What is claimed as new and desired to secure by Letters Patent of the United States is:

1. A calculating device of the class described comprising a pair of master arms pivotally connected near one end thereof, a protractor secured to one of the master arms near the pivoted end thereof, a vernier scale secured to one of the master arms, both said protractor and said vernier being substantially adjacent the pivoted ends of the master arms, a reciprocating cross member comprising a base portion and a slide portion, said base and said slide adapted to slidably engage each other, a master vernier member for slidably engaging each of said master arms, pivotal means for connecting said reciprocating slide member to one of the master verniers, pivotal means for connecting the base portion to the other of said master verniers, and protractor means substantially on opposing ends of the reciprocating cross member, said last mentioned protractor means adapted to determine the angular relation between the slide portion and one of the master arms and the base portion and the other of said master arms.

2. A device for mechanically calculating mathematical problems as set forth in claim 1 wherein each of the master vernier members has clamp means for fixedly positioning each of the master verniers in relation to each of its respective master arms, and a means between the clamping members and the respective vernier for moving said master vernier members along said master arms.

3. A calculating device of the class described as set forth in claim 1 wherein an auxiliary protractor is secured to the pivot point of the master arms, an auxiliary arm having one end thereof connected to the auxiliary protractor, graduations indicated along the length of the auxiliary arm, a vernier scale slidably engaging the auxiliary arm having a slidable connection with the reriprocating member, and a graduated member for the slidable connection to register with certain points on the reciprocating member.

4. A calculating device of the class described comprising a pair of arms pivotally connected together, means for indicating the angular relation between said arms, a member extending across the arms and comprising a pair of slidable sections, a vernier slide arranged on each arm and pivotally connected to the respective sections of said cross member, and protractor means for indicating the angular relation between the cross member and each of the arms.

5. A calculating device of the class described comprising a pair of arms pivotally connected together, means for indicating the angular relation between said arms, a member extending across the arms and comprising a pair of slidable sections, a vernier slide arranged on each arm and pivotally connected to the respective sections of said cross member, protractor means for indicating the angular relation between the cross member and each of the arms, and a locking slide connecting the free ends of the arms to hold the same in their adjusted positions.

6. A calculating device of the class described comprising a pair of arms pivotally connected together, means for indicating the angular relation between said arms, a member extending across the arms and comprising a pair of slidable sections, a vernier slide arranged on each arm and pivotally connected to the respective sections of said cross member, protractor means for indicating the angular relation between the cross member and each of the arms, and an auxiliary protractor member at the pivotal connection for the arms, and an auxiliary arm pivotally connected at one end to the auxiliary protractor.

7. A calculating device of the class described comprising a pair of arms pivotally connected together, means for indicating the angular relation between said arms, a member extending across the arms and comprising a pair of slidable sections, a vernier slide arranged on each arm and pivotally connected to the respective sections of said cross member, protractor means for indicating the angular relation between the cross member and each of the arms, an auxiliary protractor member at the pivotal connection for the arms, and an auxiliary arm pivotally connected at one end to the auxiliary protractor, said auxiliary protractor having a plurality of indentures therein to permit the auxiliary arm to be definitely adjusted from a scale position indicated on the auxiliary protractor to an angle 45° therefrom.

8. A calculating device of the class described comprising a pair of master arms pivotally connected near one end thereof, a protractor secured to one of the master arms near the pivoted end thereof, a vernier scale secured to one of the master arms, both said protractor and said vernier being substantially adjacent the pivoted ends of the master arms, a reciprocating cross member comprising a base portion and a slide portion slidably engaging each other, a master vernier member for slidably engaging each of said master arms, clamping means for fixedly positioning each of the master verniers in relation to each of its respective master arms, means between the clamping members and the respective master verniers for moving the latter along the master arms, pivotal means for connecting the reciprocating slide member to one of the master vernier members, pivotal means for connecting the base portion to the other of said master vernier members, protractor means substantially on opposing ends of the reciprocating cross member, said last mentioned protractor means adapted to determine the angular relation between the slide portion and one of the master arms and the base portion and the other of said master arms, said reciprocating cross member having graduations thereon, and the master arms having vernier scales associated therewith so that the distance from any pivotal point to an adjacent pivotal point will be recorded directly on the instrument.

9. A calculating device of the class described comprising a pair of master arms pivotally connected near one end thereof, a master protractor secured to one of the master arms near the pivoted end thereof, a master vernier scale secured to the pivoted end of the other master arm, a reciprocating cross member comprising a base portion and a slide portion slidably engaging each other, a master vernier member slidably mounted on each of the master arms, pivotal means for connecting the slide portion of the reciprocating cross member to one of the master vernier members, pivotal means for connecting the base portion of said reciprocating cross member to the other of the master vernier members, protractor means on opposing ends of the reciprocating cross member and adapted to determine the angular relation between the slide portion and one of the master arms and also between the base portion and the other of said master arms, an auxiliary protractor secured on the pivotal connection for the master arms, an auxiliary arm having one end thereof connected to the auxiliary protractor and having graduations indicated along its length, an auxiliary vernier scale slidably engaging the auxiliary arm and having slidable connection with the reciprocating cross member, a graduated member for slidable connection to register with certain points on the reciprocating member, the connection between the auxiliary arm and the auxiliary protractor being a pivotal connection, detent means provided on the auxiliary protractor, and spring means on the auxiliary arm so that the latter may be moved from one detent to another detent, said detents being substantially at a 90° angle from one another about the pivot point between the auxiliary arm and the auxiliary protractor.

ALBERT T. HARRIS.